UNITED STATES PATENT OFFICE.

WILLIAM D. BALDWIN, OF WASHINGTON, DISTRICT OF COLUMBIA, ADMINISTRATOR OF HARRY WILLIAM NEILD, DECEASED, AND FRANK CAMPBELL, OF THE COUNTY OF KENT, ENGLAND.

SOLDER.

SPECIFICATION forming part of Letters Patent No. 722,273, dated March 10, 1903.

Application filed October 3, 1901. Serial No. 77,509. (No specimens.)

*To all whom it may concern:*

Be it known that HARRY WILLIAM NEILD, engineer, late a subject of the King of Great Britain, and a resident of Holly Lodge, Tyson road, Forest Hill, in the county of Kent, England, did in his lifetime jointly invent with FRANK CAMPBELL, engineer, a subject of the King of Great Britain, residing at 89 Blackheath road, in the county of Kent, England, certain new and useful Improvements in and Relating to Solder Especially Applicable to Aluminium, of which the following is a specification.

It is well known that there are great difficulties in soldering together two pieces of aluminium; but it is found that a very strong and permanent joint between pieces of aluminium and aluminium alloys can be made with a solder consisting of aluminium, five per cent., by weight; antimony, five per cent., by weight; zinc, ninety per cent., by weight. To make a harder solder, a slightly-larger proportion of antimony may be used and a slightly-less proportion of zinc.

The solder is made as follows: The aluminium is first melted in a pot. The zinc is then added, and when this is melted the antimony is added. The metal is then thoroughly puddled with sal-ammoniac. When the surface of the metal is quite clear and white, it should be poured into sticks ready for use, the cinder being first removed.

To make joints in aluminium with this solder, the two or more surfaces to be joined should be cleaned, either by scraping or using acid, and the surfaces should then be well coated with the solder, especial care being taken that the solder has to some extent penetrated into the surface of the metal without at the same time burning it. The parts to be joined should now be placed together and kept in close contact. Heat should then be applied till the solder melts, and any surplus which squeezes out should be wiped off with any convenient instrument and the heat removed.

What is claimed is—

1. A solder consisting of aluminium, antimony, and zinc.

2. A solder consisting of five per cent. of aluminium, five per cent. of antimony, and ninety per cent. of zinc.

3. A solder consisting of aluminium, antimony and zinc in about the proportion stated, there being a relatively larger proportion of zinc.

WM. D. BALDWIN,
*Administrator of the estate of Harry William Neild, deceased.*
FRANK CAMPBELL.

Witnesses to the signature of Wm. D. Baldwin, administrator:
    LLOYD B. WIGHT,
    A. M. PARKINS.

Witnesses to the signature of Frank Campbell:
    PERCY E. MATTOCKS,
    EDMUND S. SNEWIN.